United States Patent
Gao et al.

(10) Patent No.: US 10,444,933 B2
(45) Date of Patent: Oct. 15, 2019

(54) METHOD AND APPARATUS FOR ADDING APPLICATION ICON AND METHOD AND APPARATUS FOR REMOVING APPLICATION ICON

(71) Applicant: Huawei Device Co., Ltd., Dongguan (CN)

(72) Inventors: Zhang Gao, Shanghai (CN); Shuoxing Wang, Shanghai (CN)

(73) Assignee: HUAWEI DEVICE CO., LTD., Dongguan (CN)

(*) Notice: Subject to any disclaimer, the term of this patent is extended or adjusted under 35 U.S.C. 154(b) by 418 days.

(21) Appl. No.: 14/582,870

(22) Filed: Dec. 24, 2014

(65) Prior Publication Data

US 2015/0121266 A1    Apr. 30, 2015

Related U.S. Application Data

(63) Continuation of application No. PCT/CN2014/070236, filed on Jan. 7, 2014.

(30) Foreign Application Priority Data

Jan. 7, 2013 (CN) .......................... 2013 1 0005084

(51) Int. Cl.
*G06F 3/0481* (2013.01)
*G06F 3/0488* (2013.01)
(Continued)

(52) U.S. Cl.
CPC ........ *G06F 3/04817* (2013.01); *G06F 1/1694* (2013.01); *G06F 3/0482* (2013.01);
(Continued)

(58) Field of Classification Search
CPC ............. G06F 3/04817; G06F 3/04883; G06F 3/0486; H04M 1/72583
See application file for complete search history.

(56) References Cited

U.S. PATENT DOCUMENTS 5,861,886 A    1/1999  Moran et al.
8,966,387 B2 *  2/2015  Seo ..................... G06F 3/04883
                                             715/769
(Continued)

FOREIGN PATENT DOCUMENTS

CN    102033710 A    4/2011
CN    102306080 A    1/2012
(Continued)

OTHER PUBLICATIONS

M. Pinola, "How to Copy, Cut and Paste for Beginners," published May 13, 2011, downloaded from https://lifehacker.com/5801525/help-new-pc-users-learn-how-to-copy-cut-and-paste (Year: 2011).*

(Continued)

*Primary Examiner* — Jennifer N To
*Assistant Examiner* — Eric J Yoon
(74) *Attorney, Agent, or Firm* — Slater Matsil, LLP (57) ABSTRACT

In accordance with some embodiments, a method for adding an application icon is disclosed. In the method: dragging a folder in a touch interface of a terminal; when a preset move-in triggering event is detected, determining whether a capture area of the folder includes an application icon, where the capture area of the folder is an area that is determined according to a location of the folder in the touch interface and whose size is within a preset range or the capture area of the folder is an area marked by a user in the touch interface; and when an application icon exists in coverage of the capture area of the folder, moving the application icon in the capture area of the folder from the outside of the folder to the folder.

16 Claims, 4 Drawing Sheets

(51) Int. Cl.
*G06F 3/0482* (2013.01)
*G06F 3/0486* (2013.01)
*G06F 1/16* (2006.01)

(52) U.S. Cl.
CPC .......... *G06F 3/0486* (2013.01); *G06F 3/0488* (2013.01); *G06F 2200/1637* (2013.01)

(56) References Cited

U.S. PATENT DOCUMENTS

| | | |
|---|---|---|
| 2003/0222915 A1 | 12/2003 | Marion et al. |
| 2004/0119763 A1* | 6/2004 | Mizobuchi .......... G06F 3/04883 715/863 |
| 2007/0152984 A1 | 7/2007 | Ording et al. |
| 2010/0095248 A1 | 4/2010 | Karstens |
| 2010/0235726 A1 | 9/2010 | Ording et al. |
| 2011/0025901 A1 | 2/2011 | Tsubusaki |
| 2011/0246918 A1 | 10/2011 | Henderson |
| 2011/0252346 A1 | 10/2011 | Chaudhri |
| 2011/0252373 A1 | 10/2011 | Chaudhri |
| 2011/0252375 A1* | 10/2011 | Chaudhri .......... G06F 3/04817 715/835 |
| 2012/0030628 A1 | 2/2012 | Lee et al. |
| 2012/0036460 A1 | 2/2012 | Cieplinski et al. |
| 2012/0052918 A1 | 3/2012 | Yang |
| 2012/0084688 A1* | 4/2012 | Robert ................ G06F 3/04817 715/769 |
| 2012/0151415 A1* | 6/2012 | Park .................. G06F 3/04883 715/835 |
| 2012/0266106 A1 | 10/2012 | Asaimuthu |
| 2012/0327125 A1 | 12/2012 | Kutliroff et al. |
| 2013/0019193 A1* | 1/2013 | Rhee .................... G06F 3/0486 715/769 |
| 2013/0055142 A1 | 2/2013 | Li |

FOREIGN PATENT DOCUMENTS

| | | |
|---|---|---|
| CN | 102387246 A | 3/2012 |
| CN | 102510420 A | 6/2012 |
| CN | 102662590 A | 9/2012 |
| CN | 102830907 A | 12/2012 |
| CN | 103076976 A | 5/2013 |
| EP | 2161645 A2 | 3/2010 |
| EP | 2323019 A1 | 5/2011 |
| EP | 2538305 A2 | 12/2012 |
| JP | 1091323 A | 4/1998 |
| JP | 2007328457 A | 12/2007 |
| JP | 2009151638 A | 7/2009 |
| JP | 2010256969 A | 11/2010 |
| JP | 2011238200 A | 11/2011 |
| JP | 2012113435 A | 6/2012 |
| KR | 1020120012541 A | 2/2012 |
| KR | 1020130001176 A | 1/2013 |

OTHER PUBLICATIONS

"Getting Ahead Just by Knowing, The Very Best of Make Power Tips 100, Mac100%", Jan. 1, 2013, 1 page, vol. 18, Shinyusha Co., Ltd.

* cited by examiner

METHOD AND APPARATUS FOR ADDING APPLICATION ICON AND METHOD AND APPARATUS FOR REMOVING APPLICATION ICON

This application is a continuation of International Application No. PCT/CN2014/070236, filed on Jan. 7, 2014, which claims priority to Chinese Patent Application No. 201310005084.3, filed on Jan. 7, 2013, both of which are hereby incorporated by reference in their entireties.

TECHNICAL FIELD

The present invention relates to computer technologies, and in particular, to a method and an apparatus for adding an application icon and a method and an apparatus for removing an application icon.

BACKGROUND

Smartphone platforms mainly include the IOS (iphone operating system) system of iPhone and the Android (Android) system. In an era of application and game explosion, it is extremely difficult for a desktop of a smartphone to accommodate dozens of or hundreds of application icons. To manage application icons in a classified manner, folders may be created on the desktop, and different application icons are placed in different folders by category.

Currently, in the IOS system and the Android CS system, a process of combining multiple application icons into a newly created folder is as follows: An application icon is touched and held and the application icon is dragged, the application icon is overlaid on another icon for approximately one second, and then the application icon is released. After the application icon is released, a prompt for creating a new folder appears at a location at which the two application icons are overlaid. After a folder is created, the foregoing two application icons appear in the folder. Afterwards, a next application icon is touched and held and the application icon is dragged, and the application icon is overlaid on the foregoing folder for approximately one second. After the application icon is released, the application icon is added to the foregoing folder. Other application icons are successively added to the foregoing folder by using a similar method. A user needs to perform the following operations each time the user adds an application icon to the folder: touching and holding, dragging, and releasing. If AppNum application icons are to be added to the folder, the total number N of required operations is equal to AppNum× (touching and holding×1, dragging×1, and releasing×1) =AppNum×3.

Therefore, when multiple application icons are added to a folder, the number of operations is relatively large, and operation steps are cumbersome, thereby causing low operational efficiency and poor user experience.

SUMMARY

The present invention provides a method and an apparatus for adding an application icon and a method and an apparatus for removing an application icon, so as to rapidly add multiple application icons to a folder, thereby reducing the number of operations and improving operational efficiency and user experience.

In accordance with an embodiment, a method for adding an application icon to a folder is provided. In this example, the method includes dragging a folder in a touch interface of a terminal, and determining whether a capture area of the folder comprises an application icon when a move-in triggering event is detected. The move-in triggering event is an event used to trigger moving of an application icon from outside of the folder to inside the folder. The capture area of the folder is either an area marked by a user in the touch interface or an area determined according to a location of the folder in the touch interface and having a size within a preset range. The method further includes moving the application icon in the capture area of the folder from outside of the folder to inside of the folder when an application icon exists in coverage of the capture area of the folder. A terminal apparatus for performing this method is also provided.

In accordance with another embodiment, a method for removing an application icon to a folder is provided. In this example, the method includes dragging a folder in a touch interface of a terminal, and moving the application icon from inside the folder to outside of the folder when a removing triggering event is detected. The removing the triggering event is a preset event used to trigger moving of the application icon from a folder to the outside of the folder. A terminal apparatus for performing this method is also provided.

According to a first aspect, the present invention provides a method for adding an application icon to a folder, including: dragging a folder in a touch interface of a terminal; when a preset move-in triggering event is detected, determining whether a capture area of the folder includes an application icon, where the move-in triggering event is an event used to trigger moving of an application icon from the outside of a folder to the folder, and the capture area of the folder is an area that is determined according to a location of the folder in the touch interface and whose size is within a preset range or the capture area of the folder is an area marked by a user in the touch interface; and when an application icon exists in coverage of the capture area of the folder, moving the application icon in the capture area of the folder from the outside of the folder to the folder.

With reference to the first aspect, in a first possible implementation manner, the move-in triggering event is at least one of the following events: an event of tapping the capture area of the folder; an event of drawing a first preset graph in the capture area of the folder; an event that stay duration of the folder in the touch interface reaches preset duration; an event of tapping the capture area of the folder after stay duration of the folder in the touch interface reaches preset duration; and an event of drawing a first preset graph in the capture area of the folder after stay duration of the folder in the touch interface reaches preset duration.

With reference to the first aspect or with reference to the first possible implementation manner of the first aspect, in a second possible implementation manner, the moving the application icon in the capture area of the folder from the outside of the folder to the folder specifically includes: when the application icon in the capture area of the folder is moved from the outside of the folder to the folder, displaying the moving process in an animation manner of absorbing the application icon into the folder.

With reference to the first aspect or with reference to the first or the second possible implementation manners of the first aspect, in a third possible implementation manner, after the moving the application icon in the capture area of the folder from the outside of the folder to the folder, the method further includes: moving the application icon in the folder to the outside of the folder when a removing triggering event is detected, where the removing triggering event is a preset event used to trigger moving of an application icon from a folder to the outside of the folder.

According to a second aspect, the present invention provides an apparatus for adding an application icon to a folder, including: a dragging module, configured to drag a folder in a touch interface of a terminal; a detecting module, configured to: in a process in which the dragging module drags the folder, when a preset move-in triggering event is detected, determine whether a capture area of the folder includes an application icon, where the move-in triggering event is an event used to trigger moving of an application icon from the outside of a folder to the folder, and the capture area of the folder is an area that is determined according to a location of the folder in the touch interface and whose size is within a preset range or the capture area of the folder is an area marked by a user in the touch interface; and an adding module, configured to: when the detecting module determines that an application icon exists in coverage of the capture area of the folder, move the application icon in the capture area of the folder from the outside of the folder to the folder.

With reference to the second aspect, in a first possible implementation manner, the move-in triggering event is at least one of the following events: an event of tapping the capture area of the folder; an event of drawing a first preset graph in the capture area of the folder; an event that stay duration of the folder in the touch interface reaches preset duration; an event of tapping the capture area of the folder after stay duration of the folder in the touch interface reaches preset duration; and an event of drawing a first preset graph in the capture area of the folder after stay duration of the folder in the touch interface reaches preset duration.

With reference to the second aspect or with reference to the first possible implementation manner of the second aspect, in a second possible implementation manner, the adding module is further configured to: when the application icon in the capture area of the folder is moved from the outside of the folder to the folder, display the moving process in an animation manner of absorbing the application icon into the folder.

With reference to the second aspect or with reference to the first and the second possible implementation manners of the second aspect, in a third possible implementation manner, a deleting module is configured to move an application icon in the folder to the outside of the folder when a removing triggering event is detected, where the removing triggering event is a preset event used to trigger moving of an application icon from a folder to the outside of the folder.

In the foregoing technical solutions, when an application icon is to be added to a folder, the folder is dragged, and with triggering of a move-in triggering event, if the to-be-added application icon is in a capture area of the folder, the to-be-added application icon is moved to the folder. When a next application icon is to be added, the folder does not need to be released; instead, the folder continues to be dragged, and if the next application icon is in the capture area of the folder, the next application icon is also moved to the folder. Therefore, if AppNum application icons need to be added to the folder, only AppNum times of dragging and one time of releasing need to be performed to complete the adding, whereas in the prior art, AppNum times of dragging and AppNum times of releasing need to be performed to complete the adding. Therefore, operation steps are greatly reduced, and a purpose of rapidly adding an application icon to a folder is achieved. If the foregoing folder is a recycle bin, an application icon that is not required can be rapidly added to the recycle bin, which achieves a purpose of rapidly deleting a large number of application icons.

According to a third aspect, the present invention provides a method for removing an application icon from a folder, including: dragging a folder in a touch interface of a terminal; and moving an application icon in the folder to the outside of the folder when a removing triggering event is detected, where the removing triggering event is a preset event used to trigger moving of an application icon from a folder to the outside of the folder.

With reference to the third aspect, in a first possible implementation manner, the removing triggering event is at least one of the following events: an event of shaking the terminal; an event of shaking the folder; an event of drawing a second preset graph in the touch interface; an event of drawing a second preset graph in the touch interface after shaking the terminal; and an event of drawing a second preset graph in the touch interface after shaking the folder.

With reference to the third aspect or with reference to the first possible implementation manner of the third aspect, in a second possible implementation manner, the moving an application icon in the folder to the outside of the folder when a preset removing triggering event is detected includes at least one of the following actions: moving the first application icon in the folder to the outside of the folder when it is detected that the removing triggering event is a standard removing triggering event, where the standard removing triggering event is a preset event used to trigger moving of the first application icon in a folder to the outside of the folder; and moving all application icons in the folder to the outside of the folder when it is detected that the removing triggering event is a successive removing triggering event, where the successive removing triggering event is a preset event used to trigger moving of all application icons in a folder to the outside of the folder.

With reference to the third aspect or the first and the second possible implementation manners of the third aspect, in a third possible implementation manner, before the moving the first application icon in the folder to the outside of the folder when it is detected that the removing triggering event is a preset standard removing triggering event, the method further includes: when the folder is in an open state and an icon sorting event is detected, re-sorting the application icon in the folder, where the icon sorting event is a preset event used to trigger icon re-sorting in a folder.

With reference to the third aspect or the first to the third possible implementation manners of the third aspect, in a fourth possible implementation manner, the standard removing triggering event is an event of shaking the terminal for N times, and the successive removing triggering event is an event of shaking the terminal for N+M times, where N and M are both natural numbers greater than or equal to 1.

According to a fourth aspect, the present invention provides an apparatus for removing an application icon from a folder, including: a dragging module, configured to drag a folder in a touch interface of a terminal; and a removing module, configured to: in a process in which the dragging module drags the folder, when a removing triggering event is detected, move an application icon in the folder to the outside of the folder, where the removing triggering event is a preset event used to trigger moving of an application icon from a folder to the outside of the folder.

With reference to the fourth aspect, in a first possible implementation manner, the removing triggering event is at least one of the following events: an event of shaking the terminal; an event of shaking the folder; an event of drawing a second preset graph in the touch interface; an event of drawing a second preset graph in the touch interface after shaking the terminal; and an event of drawing a second preset graph in the touch interface after shaking the folder.

With reference to the fourth aspect or with reference to the first possible implementation manner of the fourth aspect, in a second possible implementation manner, the removing module is further configured to perform at least one of the following actions: moving the first application icon in the folder to the outside of the folder when it is detected that the removing triggering event is a standard removing triggering event, where the standard removing triggering event is a preset event used to trigger moving of the first application icon in a folder to the outside of the folder; and moving all application icons in the folder to the outside of the folder when it is detected that the removing triggering event is a successive removing triggering event, where the successive removing triggering event is a preset event used to trigger moving of all application icons in a folder to the outside of the folder.

With reference to the fourth aspect or with reference to the first and the second possible implementation manners of the fourth aspect, in a third possible implementation manner, the removing module is further configured to: before the first application icon in the folder is moved to the outside of the folder when it is detected that the removing triggering event is a standard removing triggering event, and when the folder is in an open state and an icon sorting event is detected, re-sort the application icon in the folder, where the icon sorting event is a preset event used to trigger icon re-sorting in a folder.

With reference to the fourth aspect or the first to the third possible implementation manners of the fourth aspect, in a fourth possible implementation manner, the standard removing triggering event is an event of shaking the terminal for N times, and the successive removing triggering event is an event of shaking the terminal for N+M times, where N and M are both natural numbers greater than or equal to 1.

In the foregoing technical solutions, when a removing triggering event occurs, for example, when a terminal or a folder is shaken, one or more application icons may be removed from the folder without a need of opening the folder or dragging the application icon. However, in the prior art, a folder needs to be opened first, and then an application icon is removed from the folder. Therefore, the number of operations is reduced, and efficiency is improved.

According to a fifth aspect, an embodiment of the present invention provides a terminal, including: a touch screen, a transceiver, a memory, a processor, and a bus, where the touch screen, the transceiver, the memory, and the processor are connected by using the bus; and the memory is configured to store a group of program code, and the processor is configured to invoke the program code stored in the memory, so as to perform the following operations: dragging a folder in a touch interface of the touch screen; in a process in which a dragging module drags the folder, when a preset move-in triggering event is detected, determining whether a capture area of the folder includes an application icon, where the move-in triggering event is an event used to trigger moving of an application icon from the outside of a folder to the folder, and the capture area of the folder is an area that is determined according to a location of the folder in the touch interface and whose size is within a preset range or the capture area of the folder is an area marked by a user in the touch interface; and when a detecting module determines that an application icon exists in coverage of the capture area of the folder, moving the application icon in the capture area of the folder from the outside of the folder to the folder.

With reference to the fifth aspect, in a first possible implementation manner, the move-in triggering event is at least one of the following events: an event of tapping the capture area of the folder; an event of drawing a first preset graph in the capture area of the folder; an event that stay duration of the folder in the touch interface reaches preset duration; an event of tapping the capture area of the folder after stay duration of the folder in the touch interface reaches preset duration; and an event of drawing a first preset graph in the capture area of the folder after stay duration of the folder in the touch interface reaches preset duration.

With reference to the fifth aspect or the first possible implementation manner of the fifth aspect, in a second possible implementation manner, the processor is further configured to perform the following operation: when the application icon in the capture area of the folder is moved from the outside of the folder to the folder, displaying the moving process in an animation manner of absorbing the application icon into the folder.

With reference to the fifth aspect or the first and the second possible implementation manners of the fifth aspect, in a third possible implementation manner, the processor is further configured to perform the following operation: moving an application icon in the folder to the outside of the folder when a removing triggering event is detected, where the removing triggering event is a preset event used to trigger moving of an application icon from a folder to the outside of the folder.

In the foregoing technical solution, when an application icon is to be added to a folder, the folder is dragged, and with triggering of a move-in triggering event, if the to-be-added application icon is in a capture area of the folder, the to-be-added application icon is moved to the folder. When a next application icon is to be added, the folder does not need to be released; instead, the folder continues to be dragged, and if the next application icon is in the capture area of the folder, the next application icon is also moved to the folder. Therefore, if AppNum application icons need to be added to the folder, only AppNum times of dragging and one time of releasing need to be performed to complete the adding, whereas in the prior art, AppNum times of dragging and AppNum times of releasing need to be performed to complete the adding. Therefore, operation steps are greatly reduced, and a purpose of rapidly adding an application icon to a folder is achieved. If the foregoing folder is a recycle bin, an application icon that is not required can be rapidly added to the recycle bin, which achieves a purpose of rapidly deleting a large number of application icons.

According to a sixth aspect, an embodiment of the present invention further provides a terminal, including: a touch screen, a transceiver, a memory, a processor, and a bus, where the touch screen, the transceiver, the memory, and the processor are connected by using the bus; and the memory is configured to store a group of program code, and the processor is configured to invoke the program code stored in the memory, so as to perform the following operations: dragging a folder in a touch interface of the touch screen; and in a process in which a dragging module drags the folder, when a removing triggering event is detected, moving an application icon in the folder to the outside of the folder, where the removing triggering event is a preset event used to trigger moving of an application icon from a folder to the outside of the folder.

With reference to the sixth aspect, in a first possible implementation manner, the removing triggering event is at least one of the following events: an event of shaking the terminal; an event of shaking the folder; an event of drawing a second preset graph in the touch interface; an event of drawing a second preset graph in the touch interface after shaking the terminal; and an event of drawing a second preset graph in the touch interface after shaking the folder.

With reference to the sixth aspect or the first possible implementation manner of the sixth aspect, in a second possible implementation manner, the processor is further configured to perform at least one of the following actions: moving the first application icon in the folder to the outside of the folder when it is detected that the removing triggering event is a standard removing triggering event, where the standard removing triggering event is a preset event used to trigger moving of the first application icon in a folder to the outside of the folder; and moving all application icons in the folder to the outside of the folder when it is detected that the removing triggering event is a successive removing triggering event, where the successive removing triggering event is a preset event used to trigger moving of all application icons in a folder to the outside of the folder.

With reference to the sixth aspect or the first and the second possible implementation manners of the sixth aspect, in a third possible implementation manner, the processor is further configured to perform the following operation: before the first application icon in the folder is moved to the outside of the folder when it is detected that the removing triggering event is a standard removing triggering event, and when the folder is in an open state and an icon sorting event is detected, re-sorting the application icon in the folder, where the icon sorting event is a preset event used to trigger icon re-sorting in a folder.

With reference to the sixth aspect or the first to the third possible implementation manners of the sixth aspect, in a fourth possible implementation manner, the standard removing triggering event is an event of shaking the terminal for N times, and the successive removing triggering event is an event of shaking the terminal for N+M times, where N and M are both natural numbers greater than or equal to 1.

In the foregoing technical solution, when a removing triggering event occurs, for example, when a terminal or a folder is shaken, one or more application icons may be removed from the folder without a need of opening the folder or dragging the application icon. However, in the prior art, a folder needs to be opened first, and then an application icon is removed from the folder. Therefore, the number of operations is reduced, and efficiency is improved.

DETAILED DESCRIPTION OF ILLUSTRATIVE EMBODIMENTS

An execution body of each method embodiment of the present invention is a terminal that has a touch interface, and specifically, may be a processor in the terminal that has a touch interface.

Figure 1A:
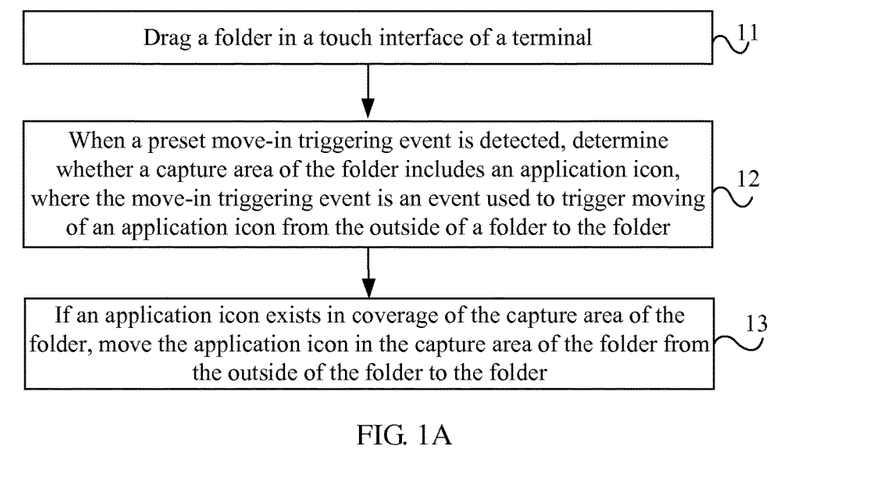
FIG. 1A is a flowchart of a method for adding an application icon to a folder according to an embodiment of the present invention.

FIG. 1A is a flowchart of a method for adding an application icon to a folder according to an embodiment of the present invention. As shown in FIG. 1A, the method provided in this embodiment includes:

Step 11: Drag a folder in a touch interface of a terminal.

When expecting to add an application icon to a folder, a user may drag the folder in a touch interface, and drags the folder to an area above or near the to-be-added icon.

Step 12: When a preset move-in triggering event is detected, determine whether a capture area of the folder includes an application icon, where the move-in triggering event is an event used to trigger moving of an application icon from the outside of a folder to the folder, and the capture area of the folder is an area that is determined according to a location of the folder in the touch interface and whose size is within a preset range or the capture area of the folder is an area marked by a user in the touch interface.

Figure 1B:
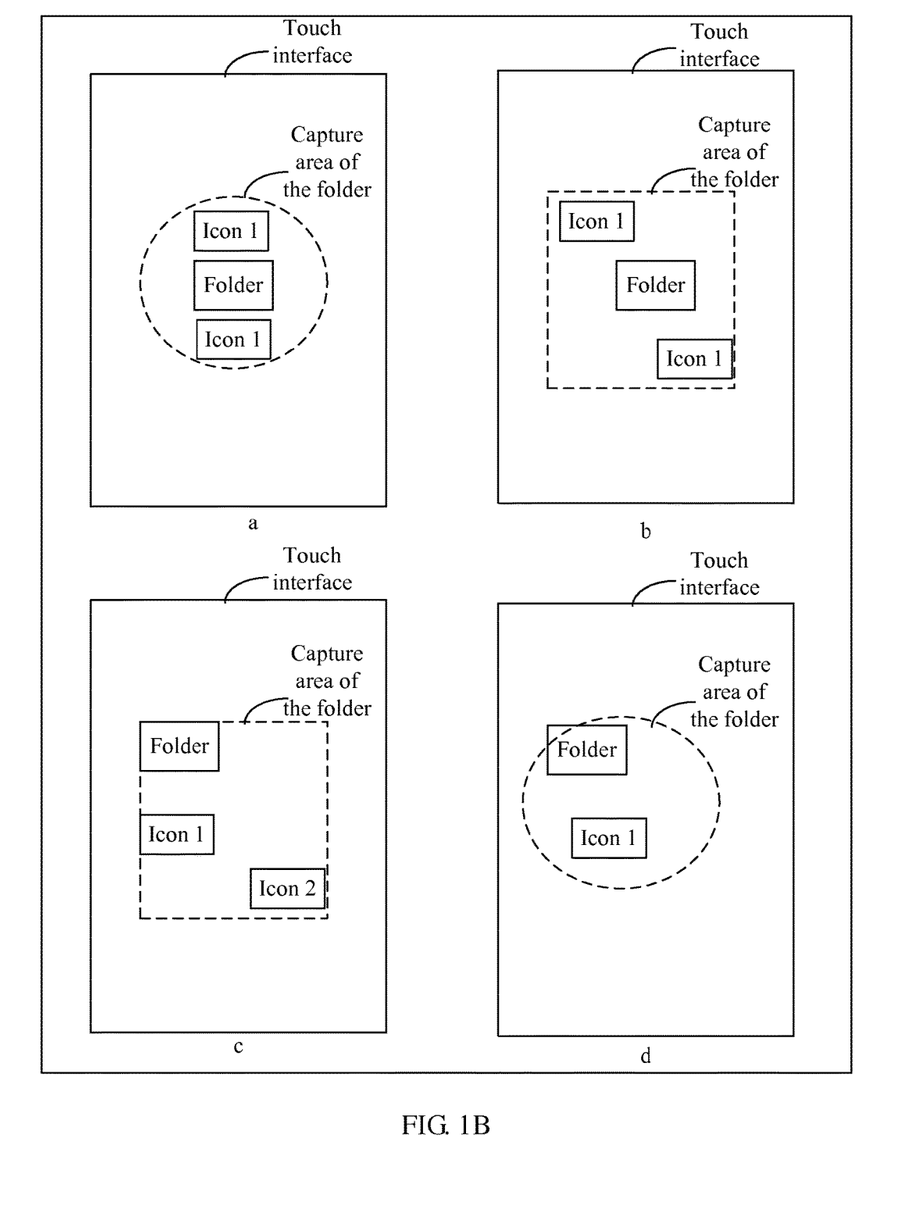
FIG. 1B is an application scenario diagram of FIG. 1A.

In a process of dragging the folder, when the preset move-in triggering event is detected, the capture area of the folder that is dragged is determined in the following manners: It is determined whether an application icon exists in coverage of the capture area. If at least one application icon or a part of at least one application icon is in the capture area, it may be determined that an application icon exists in the capture area. If no part of an application icon is in the capture area, it may be determined that no application icon exists in the capture area. The capture area may be displayed in a highlighted manner. A shape of the capture area may be any shape, for example, a square or a round. The capture area may accommodate multiple icons, and may also accommodate one icon. The folder that is dragged and an application icon that is not dragged may be located at different layers. An application icon of the folder that is dragged is located at a drag layer, the application icon that is not dragged is located at a static layer, and the capture area is located at the static layer. There are two manners for determining the capture area of the folder that is dragged. One manner is as follows: The capture area is determined according to a location of the folder, which is dragged, in the touch interface, where a size of the capture area is within a preset range. That is, the capture area of the folder that is dragged is the area that is determined according to the location of the folder in the touch interface and whose size is within the preset range. As shown in FIG. 1B, the capture area may be an area in which the folder that is dragged is used as a center, and may also be an area that extends, by using the location of the folder that is dragged as a starting point, to each direction, for example, extends to a direction of the left side, the right side, the upside, or the downside of the folder.

The other manner for determining the capture area of the folder that is dragged is as follows: When dragging the folder by using a finger, the user may use another finger to mark an area with a specific range in the touch interface.

That is, the capture area of the folder that is dragged is the area marked by the user in the touch interface of the terminal.

The move-in triggering event may be at least one of the following events: an event of tapping the capture area of the folder, an event of drawing a first preset graph in the capture area of the folder, and an event that stay duration of the folder in the touch interface reaches preset duration, where the first preset graph may be a graph such as a circle, an arc, an arrow, or a "✓". Further, the move-in triggering event may be a combination of the foregoing events, for example, an event of tapping the capture area of the folder after stay duration of the folder in the touch interface reaches preset duration, that is, after it is detected that the stay duration of the folder in the touch interface reaches the preset duration and when it is further detected that the capture area of the folder is tapped, it is considered that a move-in triggering event occurs; and for example, an event of drawing a first preset graph in the capture area of the folder after stay duration of the folder in the touch interface reaches preset duration, that is, after it is detected that the stay duration of the folder in the touch interface reaches the preset duration and when the event of drawing the first preset graph in the capture area of the folder is further detected, it is considered that a move-in triggering event occurs.

Step 13: If an application icon exists in coverage of the capture area of the folder, move the application icon in the capture area of the folder from the outside of the folder to the folder.

The folder continues to be dragged, and the foregoing steps are repeated. Until all to-be-added icons are added to the folder, the folder is released. After an application icon in the capture area of the folder is moved to the folder, if another application icon also needs to be added to the folder, the folder may continue to be dragged, and the folder is dragged to an area above or near the to-be-added icon. Step 12 and step 13 are repeated, and until all to-be-added icons are moved to the folder, the folder is released.

Figure 1C:
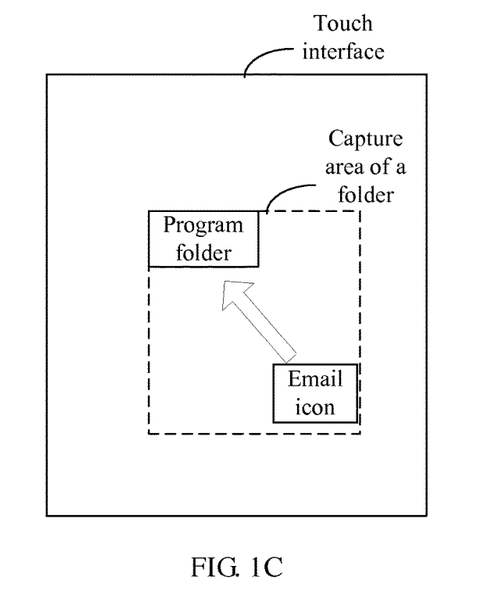
FIG. 1C is another application scenario diagram of FIG. 1A.

For example, as shown in FIG. 1C, when an email icon needs to be added to a program folder, the program folder is dragged, and the program folder is dragged to an area near the email icon, so that the email icon is in a capture area of the program folder. After the program folder stays in the touch interface for 500 ms, if it is detected that the email icon is in the capture area of the program folder, the email icon is moved from the outside of the program folder to the program folder. To increase enjoyment, moving the email icon to the program folder may be displayed to the user in an animation manner of absorbing the mail icon into the folder. If a game icon also needs to be added to the program folder, the program folder continues to be dragged, so that the game icon is near the program folder. When the program folder stays in the capture area for 500 ms, if it is detected that the game icon is in the capture area of the program folder, the game icon is moved to the program folder. If all icons are added to the program folder, the program folder is released to an expected location.

Optionally, in a process in which the application icon in the capture area of the folder that is dragged is moved from the outside of the folder that is dragged to the folder, the foregoing animation manner of absorbing the application icon into the folder that is dragged may also be used to display the foregoing moving process in which the application icon is moved from the outside of the folder that is dragged to the folder that is dragged, thereby increasing enjoyment.

Further, after the application icon is moved to the folder that is dragged, if it is found that the application icon is not an expected to-be-added application icon, when a removing triggering event is detected, the application icon in the folder that is dragged may be moved back to the outside of the folder that is dragged, so as to restore the application icon to an original location, where the removing triggering event is a preset event used to trigger moving of an application icon from a folder to the outside of the folder. The removing triggering event may be shaking the terminal, for example, shaking the terminal in a left-right manner or in an up-down manner; and the removing triggering event may also be shaking the folder, for example, shaking the folder in each direction. A built-in gyroscope of the terminal may be used to determine whether the terminal is shaken.

According to the method provided in this embodiment, when an application icon is to be added to a folder, the folder is dragged; and with triggering of a move-in triggering event, if the to-be-added application icon is in a capture area of the folder, the to-be-added application icon is moved to the folder. When a next application icon is to be added, the folder does not need to be released; instead, the folder continues to be dragged, and if the next application icon is in the capture area of the folder, the next application icon is also moved to the folder. Therefore, if AppNum application icons need to be added to the folder, only AppNum times of dragging and one time of releasing need to be performed to complete the adding, whereas in the prior art, AppNum times of dragging and AppNum times of releasing need to be performed to complete the adding. Therefore, operation steps are greatly reduced, and a purpose of rapidly adding an application icon to a folder is achieved. If the foregoing folder is a recycle bin, an application icon that is not required can be rapidly added to the recycle bin, which achieves a purpose of rapidly deleting a large number of application icons.

Figure 2:
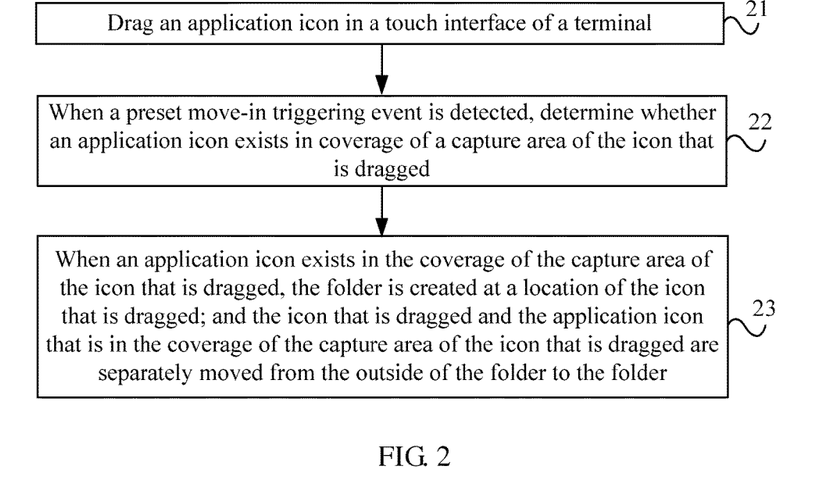
FIG. 2 is a flowchart of a method for creating a folder according to an embodiment of the present invention.

FIG. 2 is a flowchart of a method for creating a folder according to an embodiment of the present invention. This embodiment describes how to create a folder, for example, a process of creating a folder that is dragged in the embodiment corresponding to FIG. 1A. As shown in FIG. 2, the method provided in this embodiment includes:

Step 21: Drag an application icon in a touch interface of a terminal.

Step 22: When a preset move-in triggering event is detected, determine whether an application icon exists in coverage of a capture area of the application icon that is dragged.

In a process of dragging the application icon, when the preset move-in triggering event is detected, for example, when it is detected that a user taps the capture area of the application icon that is dragged, or when it is detected that a user draws, around an application icon in the capture area of the application icon that is dragged, a first preset graph such as a circle gesture, or when it is detected that stay duration of the application icon that is dragged in the touch interface reaches preset duration, the capture area of the application icon that is dragged is determined in the following manner: It is determined whether an application icon exists in the coverage of the capture area. If at least one application icon or a part of at least one application icon is in the capture area, it may be determined that an application icon exists in the capture area. If no part of an application icon is in the capture area, it may be determined that no application icon exists in the capture area. The capture area may be displayed in a highlighted manner. A shape of the capture area may be any shape, for example, a square or a round. The capture area may accommodate multiple icons, and may also accommodate one icon. The application icon that is dragged and an application icon that is not dragged may be located at different layers. An application icon that is dragged is located at a drag layer, the application icon that is not dragged is located at a static layer, and the capture area is located at the static layer.

Being similar to manners for determining a capture area of a folder that is dragged, there are two manners for determining the capture area of the application icon that is dragged. One manner is as follows: The capture area is determined according to a location of the application icon that is dragged in the touch interface, where a size of the capture area is within a preset range. That is, the capture area of the application icon that is dragged is an area that is determined according to the location of the application icon that is dragged in the touch interface and whose size is within the preset range. Likewise, the capture area of the application icon that is dragged may be an area in which the application icon that is dragged is used as a center, and may also be an area that extends outwards by using the location of the application icon that is dragged as a starting point.

The other manner for determining the capture area of the application icon that is dragged is as follows: When dragging the application icon by using a finger, the user may use another finger to mark an area with a specific range in the touch interface. That is, the capture area of the application icon that is dragged is the area marked by the user in the touch interface of the terminal.

Likewise, the move-in triggering event may be at least one of the following events: an event of tapping the capture area of the application icon that is dragged, an event of drawing a first preset graph in the capture area of the application icon that is dragged, and an event that stay duration of the application icon that is dragged in the touch interface reaches preset duration, where the first preset graph may be a graph such as a circle, an arc, or an arrow. Further, the move-in triggering event may be a combination of the foregoing events, for example, an event of tapping, after stay duration of the application icon that is dragged in the touch interface reaches preset duration, the capture area of the application icon that is dragged, that is, after it is detected that the stay duration of the application icon that is dragged in the touch interface reaches the preset duration and when it is further detected that the capture area of the application icon that is dragged is tapped, it is considered that a move-in triggering event occurs; and for example, an event of drawing, after stay duration of the application icon that is dragged in the touch interface reaches preset duration, a first preset graph in the capture area of the application icon that is dragged, that is, after it is detected that the stay duration of the application icon that is dragged in the touch interface reaches the preset duration and when the event of drawing the first preset graph in the capture area of the application icon that is dragged is further detected, it is considered that a move-in triggering event occurs.

Step 23: When an application icon exists in the coverage of the capture area of the application icon that is dragged, a folder is created at a location of the application icon that is dragged; and the application icon that is dragged and the application icon that is in the coverage of the capture area of the application icon that is dragged are separately moved from the outside of the folder to the folder.

When an application icon exists in the coverage of the capture area of the application icon that is dragged, it is determined that the application icon is an application icon expected by the user to be added to a same folder as the application icon that is dragged. Therefore, a new folder is created at the location of the application icon that is dragged, and the application icon that is dragged and the application icon that is in the coverage of the capture area of the application icon that is dragged are separately moved from the outside of the newly created folder to the newly created folder.

Optionally, in a process in which the application icon that is dragged and the application icon that is in the coverage of the capture area of the application icon that is dragged is moved from the outside of the newly created folder to the folder, an animation manner of absorbing the application icon into the folder may be used to display a moving process in which the application icon is moved from the outside of the folder that is dragged to the folder that is dragged, thereby increasing enjoyment.

For example, if the user expects to copy or cut a camera icon and a gallery icon into a new folder, the user may touch and hold the camera icon by using a finger, so that the camera icon is in a dragged state, and then drag the camera icon to an area above or near the gallery icon by moving the finger. When stay duration of the camera icon that is in the dragged state in the touch interface reaches preset duration, it is determined whether an application icon exists in coverage of a capture area. If an application icon exists, a new folder is created in the touch interface, and the camera icon and the gallery icon are separately moved from the outside of the folder to the folder.

Figure 3:
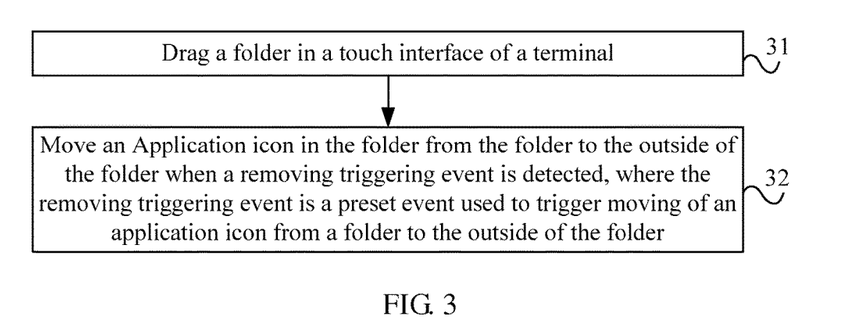
FIG. 3 is a flowchart of a method for removing an application icon from a folder according to an embodiment of the present invention.

FIG. 3 is a flowchart of a method for removing an application icon from a folder according to an embodiment of the present invention. As shown in FIG. 3, the method provided in this embodiment includes:

Step 31: Drag a folder in a touch interface of a terminal.

Step 32: Move an application icon in the folder to the outside of the folder when a removing triggering event is detected, where the removing triggering event is a preset event used to trigger moving of an application icon from a folder to the outside of the folder.

Specifically, the removing triggering event is at least one of the following events: an event of shaking the terminal, for example, shaking the terminal in a left-right manner or in an up-down manner, where a built-in gyroscope of the terminal may be used to determine whether the terminal is shaken; an event of shaking the folder, for example, shaking the folder in each direction of the touch interface; an event of drawing a second preset graph in the touch interface, for example, drawing a graph such as a triangle or "x"; an event of drawing a second preset graph in the touch interface after shaking the terminal; and an event of drawing a second preset graph in the touch interface after shaking the folder.

By using the foregoing method, if the foregoing folder is a recycle bin, one or more icons in the recycle bin may be removed from the recycle bin when a removing triggering event is detected.

According to the method provided in this embodiment, when a removing triggering event occurs, for example, when a terminal or a folder is shaken, one or more icons may be removed from the folder without a need of opening the folder or dragging the application icon. However, in the prior art, a folder needs to be opened first, and then an application icon is removed from the folder. Therefore, in this embodiment, the number of operations is reduced, and efficiency is improved.

Further, the first application icon in the folder is moved to the outside of the folder when it is detected that the removing triggering event is a standard removing triggering event, where the standard removing triggering event is a preset event used to trigger moving of the first application icon from a folder to the outside of the folder. The standard removing triggering event may be an event of shaking the terminal for N times, where N is a natural number greater than or equal to 1. For example, shaking the terminal for one time is a standard removing triggering event.

Optionally, before the first application icon in the folder is moved to the outside of the folder when it is detected that the removing triggering event is a preset standard removing triggering event, the method further includes: when the folder is in an open state, and an icon sorting event is detected, re-sorting the application icon in the folder, where the icon sorting event is a preset event used to trigger icon re-sorting in a folder, and the icon sorting event may be at least one of the following events: an event of sliding the touch interface, for example, an event of sliding the touch interface in an up-down manner or in a left-right manner; and an event of drawing a third preset graph in the touch interface.

Further, all application icons in the folder are successively moved to the outside of the folder when it is detected that the removing triggering event is a successive removing triggering event, where the successive removing triggering event is a preset event used to trigger moving of all application icons in a folder to the outside of the folder. The successive removing triggering event is shaking the terminal for N+M times, where N and M are both natural numbers greater than or equal to 1. For example, shaking the terminal for more than two times is a successive removing triggering event.

Figure 4:
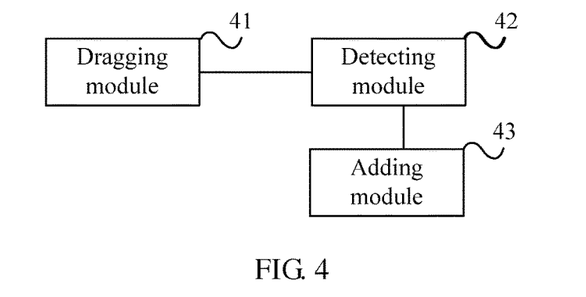
FIG. 4 is a schematic structural diagram of an apparatus for adding an application icon to a folder according to an embodiment of the present invention.

FIG. 4 is a schematic structural diagram of an apparatus for adding an application icon to a folder according to an embodiment of the present invention. As shown in FIG. 4, the apparatus provided in this embodiment includes: a dragging module 41, a detecting module 42, and an adding module 43.

The dragging module 41 is configured to drag a folder in a touch interface of a terminal.

The detecting module 42 is configured to: in a process in which the dragging module drags the folder, when a preset move-in triggering event is detected, determine whether a capture area of the folder includes an application icon, where the move-in triggering event is an event used to trigger moving of an application icon from the outside of a folder to the folder, and the capture area of the folder is an area that is determined according to a location of the folder in the touch interface and whose size is within a preset range or the capture area of the folder is an area marked by a user in the touch interface.

Optionally, the move-in triggering event is at least one of the following events: an event of tapping the capture area of the folder; an event of drawing a first preset graph in the capture area of the folder; an event that stay duration of the folder in the touch interface reaches preset duration; an event of tapping the capture area of the folder after stay duration of the folder in the touch interface reaches preset duration; and an event of drawing a first preset graph in the capture area of the folder after stay duration of the folder in the touch interface reaches preset duration.

The adding module 43 is configured to: when the detecting module determines that an application icon exists in coverage of the capture area of the folder, move the application icon in the capture area of the folder from the outside of the folder to the folder.

Optionally, the adding module 43 is further configured to: when the application icon in the capture area of the folder is moved from the outside of the folder to the folder, display the moving process in an animation manner of absorbing the application icon into the folder.

For functions of each module in the apparatus shown in FIG. 4, reference may be made to the description in the embodiment corresponding to FIG. 1A. Details are not described herein again.

According to the apparatus provided in this embodiment, when an application icon is to be added to a folder, the folder is dragged, and with triggering of a move-in triggering event, if the to-be-added application icon is in a capture area of the folder, the to-be-added application icon is moved to the folder. When a next application icon is to be added, the folder does not need to be released; instead, the folder continues to be dragged, and if the next application icon is in the capture area of the folder, the next application icon is also moved to the folder. Therefore, if AppNum application icons need to be added to the folder, only AppNum times of dragging and one time of releasing need to be performed to complete the adding, whereas in the prior art, AppNum times of dragging and AppNum times of releasing need to be performed to complete the adding. Therefore, operation steps are greatly reduced, and a purpose of rapidly adding an application icon to a folder is achieved. If the foregoing folder is a recycle bin, an application icon that is not required can be rapidly added to the recycle bin, which achieves a purpose of rapidly deleting a large number of application icons.

Figure 5:
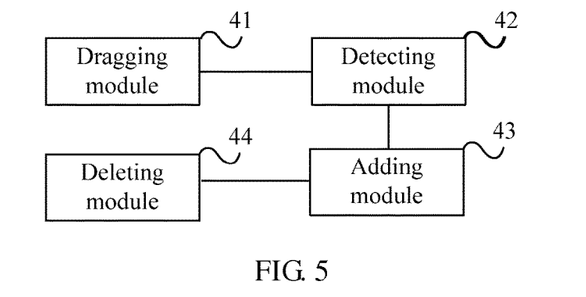
FIG. 5 is a schematic structural diagram of another apparatus for adding an application icon to a folder according to an embodiment of the present invention.

As shown in FIG. 5, the apparatus shown in FIG. 4 may further include: a deleting module 44.

The deleting module 44 is configured to move an application icon in the folder to the outside of the folder when a removing triggering event is detected, where the removing triggering event is a preset event used to trigger moving of an application icon from a folder to the outside of the folder.

The removing triggering event is at least one of the following events: an event of shaking the terminal; an event of shaking the folder; an event of drawing a second preset graph in the touch interface; an event of drawing a second preset graph in the touch interface after shaking the terminal; and an event of drawing a second preset graph in the touch interface after shaking the folder.

For functions of each module in the apparatus shown in FIG. 5, reference may be made to descriptions in the embodiments corresponding to FIG. 1A and FIG. 3. Details are not described herein again.

Figure 6:
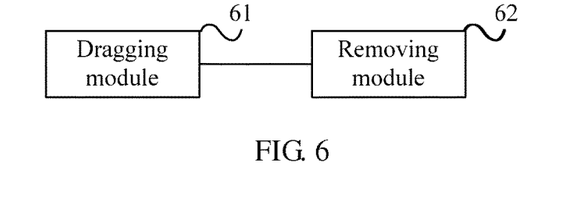
FIG. 6 is a schematic structural diagram of an apparatus for removing an application icon from a folder according to an embodiment of the present invention.

FIG. 6 is a schematic structural diagram of an apparatus for removing an application icon from a folder according to an embodiment of the present invention. As shown in FIG. 6, the apparatus provided in this embodiment includes a dragging module 61 and a removing module 62.

The dragging module 61 is configured to drag a folder in a touch interface of a terminal.

The removing module 62 is configured to: in a process in which the dragging module 61 drags the folder, when a preset removing triggering event is detected, move an application icon in the folder to the outside of the folder, where the removing triggering event is an event used to trigger moving of an application icon from a folder to the outside of the folder.

Optionally, the removing triggering event is at least one of the following events: an event of shaking the terminal; an event of shaking the folder; an event of drawing a second preset graph in the touch interface; an event of drawing a second preset graph in the touch interface after shaking the terminal; and an event of drawing a second preset graph in the touch interface after shaking the folder.

Optionally, the removing module 62 is further configured to move the first application icon in the folder to the outside of the folder when it is detected that the removing triggering event is a standard removing triggering event, where the standard removing triggering event is a preset event used to trigger moving of the first application icon in a folder to the outside of the folder. Further, the removing module 62 is further configured to: before the first application icon in the folder is moved to the outside of the folder when it is detected that the removing triggering event is a preset standard removing triggering event, and when the folder is in an open state and an icon sorting event is detected, re-sort the application icon in the folder, where the icon sorting event is a preset event used to trigger icon re-sorting in a folder. The standard removing triggering event is shaking the terminal for N times, where N is a natural number greater than or equal to 1.

Optionally, the removing module 62 is further configured to successively move all application icons in the folder to the outside of the folder when it is detected that the removing triggering event is a successive removing triggering event, where the successive removing triggering event is a preset event used to trigger moving of all application icons in a folder to the outside of the folder. The successive removing triggering event is shaking the terminal for N+M times, where N and M are both natural numbers greater than or equal to 1.

For functions of each module in the apparatus shown in FIG. 6, reference may be made to the description in the embodiment corresponding to FIG. 3. Details are not described herein again.

According to the apparatus provided in this embodiment, when a removing triggering event occurs, for example, when a terminal or a folder is shaken, one or more application icons may be removed from the folder without a need of opening the folder or dragging the application icon. However, in the prior art, a folder needs to be opened first, and then an application icon is removed from the folder. Therefore, the number of operations is reduced, and efficiency is improved.

An embodiment of the present invention further provides a terminal, including: a touch screen, a transceiver, a memory, a processor, and a bus, where the touch screen, the transceiver, the memory, and the processor are connected by using the bus; and the memory is configured to store a group of program code, and the processor is configured to invoke the program code stored in the memory, so as to perform the following operations: dragging a folder in a touch interface of the touch screen; in a process in which a dragging module drags the folder, when a preset move-in triggering event is detected, determining whether a capture area of the folder includes an application icon, where the move-in triggering event is an event used to trigger moving of an application icon from the outside of a folder to the folder, and the capture area of the folder is an area that is determined according to a location of the folder in the touch interface and whose size is within a preset range or the capture area of the folder is an area marked by a user in the touch interface; and when a detecting module determines that an application icon exists in coverage of the capture area of the folder, moving the application icon in the capture area of the folder from the outside of the folder to the folder.

The move-in triggering event is at least one of the following events: an event of tapping the capture area of the folder; an event of drawing a first preset graph in the capture area of the folder; an event that stay duration of the folder in the touch interface reaches preset duration; an event of tapping the capture area of the folder after stay duration of the folder in the touch interface reaches preset duration; and an event of drawing a first preset graph in the capture area of the folder after stay duration of the folder in the touch interface reaches preset duration.

Optionally, the processor is further configured to perform the following operation: when the application icon in the capture area of the folder is moved from the outside of the folder to the folder, displaying the moving process in an animation manner of absorbing the application icon into the folder.

Optionally, the processor is further configured to perform the following operation: moving an application icon in the folder to the outside of the folder when a removing triggering event is detected, where the removing triggering event is a preset event used to trigger moving of an application icon from a folder to the outside of the folder.

An embodiment of the present invention further provides a terminal, including: a touch screen, a transceiver, a memory, a processor, and a bus, where the touch screen, the transceiver, the memory, and the processor are connected by using the bus; and the memory is configured to store a group of program code, and the processor is configured to invoke the program code stored in the memory, so as to perform the following operations: dragging a folder in a touch interface of the touch screen; and in a process in which a dragging module drags the folder, when a removing triggering event is detected, moving an application icon in the folder to the outside of the folder, where the move-in triggering event is a preset event used to trigger moving of an application icon from a folder to the outside of the folder.

Optionally, the removing triggering event is at least one of the following events: an event of shaking the terminal; an event of shaking the folder; an event of drawing a second preset graph in the touch interface; an event of drawing a second preset graph in the touch interface after shaking the terminal; and an event of drawing a second preset graph in the touch interface after shaking the folder.

Optionally, the processor is further configured to perform at least one of the following actions: moving the first application icon in the folder to the outside of the folder when it is detected that the removing triggering event is a standard removing triggering event, where the standard removing triggering event is a preset event used to trigger moving of the first application icon in a folder to the outside of the folder; and moving all application icons in the folder to the outside of the folder when it is detected that the removing triggering event is a successive removing triggering event, where the successive removing triggering event is a preset event used to trigger moving of all application icons in a folder to the outside of the folder.

Optionally, the processor is further configured to perform the following operation: before the first application icon in the folder is moved to the outside of the folder when it is detected that the removing triggering event is a standard removing triggering event, and when the folder is in an open state and an icon sorting event is detected, re-sorting the application icon in the folder, where the icon sorting event is a preset event used to trigger icon re-sorting in a folder.

Optionally, the standard removing triggering event is an event of shaking the terminal for N times, and the successive removing triggering event is an event of shaking the terminal for N+M times, where N and M are both natural numbers greater than or equal to 1.

Optionally, the icon sorting event is at least one of the following events: an event of sliding the touch interface; and an event of drawing a third preset graph in the touch interface.

Persons of ordinary skill in the art may understand that all or a part of the steps of the method embodiments may be implemented by a program instructing relevant hardware. The foregoing program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof; however, these modifications or replacements do not make the essence of corresponding technical solutions depart from the scope of the technical solutions in the embodiments of the present invention.

What is claimed is:

1. A terminal, comprising:
   a touch screen;
   at least one processor; and
   a memory coupled to the at least one processor and storing programming instructions that, when executed by the at least one processor, cause the terminal to:
   display a folder icon corresponding to a folder at a first location on the touch screen;
   display a first application icon at a second location on the touch screen;
   display a second application icon at a third location on the touch screen;
   detect a first dragging operation on the folder icon from the first location to the second location;
   determine, in response to the first dragging operation, whether the first application icon exists in a first capture area of the folder;
   automatically move the first application icon from the second location to the folder in response to determining that the first application icon exists in the first capture area of the folder;
   detecting a second dragging operation on the folder icon proximate to the third location;
   determine whether the second application icon exists in a second capture area of the folder in response to the second dragging operation, wherein each of the first capture area and the second capture area are an area that is determined according to a current location of the folder on the touch screen and whose size is within a preset range;
   automatically move the second application icon from the third location to the folder in response to determining that the second application icon exists in the second capture area of the folder and after the first application is moved into the folder;
   detect a shaking motion imparted in the touchscreen on the folder icon, wherein the shaking motion imparted on the folder icon is different from shaking the terminal, and wherein the shaking motion imparted on the folder icon is detected by an element of the terminal other than a gyroscope of the terminal; and
   move the second application icon from the folder to the third location on the touch screen in response to detecting the shaking motion imparted on the folder icon, while retaining the first application icon in the folder.

2. The terminal according to claim 1, wherein the shaking motion imparted on the folder icon comprises shaking the folder icon in a plurality of directions on the touch screen.

3. The terminal according to claim 1, wherein the memory further stores programming instructions that, when executed by the at least one processor, cause the terminal to:
   move all application icons in the folder to the outside of the folder in response to detecting a successive removing triggering event, wherein the successive removing triggering event is an event of shaking the terminal a specific number of times.

4. The terminal according to claim 1, wherein the memory further stores programming instructions that, when executed by the at least one processor, cause the terminal to:
   re-sort at least one of the first and second application icons in the folder when the folder icon is in an open state and an icon sorting event is detected, wherein the icon sorting event is a preset event used to trigger icon re-sorting in a folder.

5. The terminal according to claim 1, wherein each of the first capture area and the second capture area are displayed in a highlighted manner.

6. The terminal according to claim 1, wherein the memory further stores programming instructions that, when executed by the at least one processor, cause the terminal to:
   set each of the first capture area and the second capture area during the first and second dragging operations and while a first finger of a user is on the folder icon and further in response to an input by a second finger of the user being different from the first finger.

7. The terminal according to claim 1, wherein the memory further stores programming instructions that, when executed by the at least one processor, cause the terminal to:
   display a moving process in an animation manner showing absorption of the first application icon into the folder when moving the first application icon from the second location to the folder.

8. The terminal according to claim 1, wherein the memory further stores programming instructions that, when executed by the at least one processor, cause the terminal to:
   release the folder icon.

9. A method for adding an application icon to a folder, comprising:
   displaying, by a terminal, a folder icon corresponding to a folder at a first location on a touch screen of the terminal;
   displaying, by the terminal, a first application icon at a second location on the touch screen;
   displaying, by the terminal, a second application icon at a third location on the touch screen;
   detecting, by the terminal, a first dragging operation on the folder icon from the first location to the second location;
   in response to the first dragging operation, determining, by the terminal, whether the first application icon exists in a first capture area of the folder;
   automatically moving, by the terminal, in response to determining that the first application icon exists in the first capture area of the folder, the first application icon from the second location to the folder;

detecting, by the terminal, a second dragging operation on the folder icon proximate to the third location;

determining, by the terminal, in response to the second dragging operation, whether the second application icon exists in a second capture area of the folder, wherein each of the first capture area and the second capture area is an area that is determined according to a current location of the folder on the touch screen and whose size is within a preset range;

automatically moving, by the terminal, the second application icon from the third location to the folder in response to determining that the second application icon exists in the second capture area of the folder and after the first application is moved into the terminal;

detecting, by the terminal, a shaking motion imparted in the touchscreen on the folder icon, wherein the shaking motion imparted on the folder icon is different from shaking the terminal, and wherein the shaking motion imparted on the folder icon is detected by an element of the terminal other than a gyroscope of the terminal;

moving, by the terminal, in response to detecting the shaking motion imparted on the folder icon, the second application icon from the folder to the third location on the touch screen, while retaining the first application icon from the folder in the folder.

10. The method according to claim 9, wherein the shaking motion imparted on the folder icon comprises shaking the folder icon in a plurality of directions on the touch screen.

11. The method according to claim 9, further comprising:
moving, by the terminal, all application icons in the folder to the outside of the folder in response to detecting a successive removing triggering event, wherein the successive removing triggering event is an event of shaking the terminal for a specific number of times.

12. The method according to claim 9, further comprising:
re-sorting, by the terminal, at least one of the application icons in the folder when the folder icon is in an open state and an icon sorting event is detected, wherein the icon sorting event is a preset event used to trigger icon re-sorting in a folder.

13. The method according to claim 9, wherein each of the first capture area and the second capture area are displayed in a highlighted manner.

14. The method according to claim 9, further comprising:
set each of the first capture area and the second capture area during the first and second dragging operations and while a first finger of a user is on the folder icon and further in response to an input by a second finger of the user different from the first finger.

15. The method according to claim 9, further comprising:
displaying, by the terminal, a moving process in an animation manner showing absorption of the first application icon into the folder when moving the first application icon from the second location to the folder.

16. The method according to claim 9, further comprising:
releasing, by the terminal, the folder icon.

* * * * *